May 30, 1950 — A. E. RUDAHL — 2,510,038
ELECTRIC BLANKET CONTROL
Filed Jan. 17, 1947
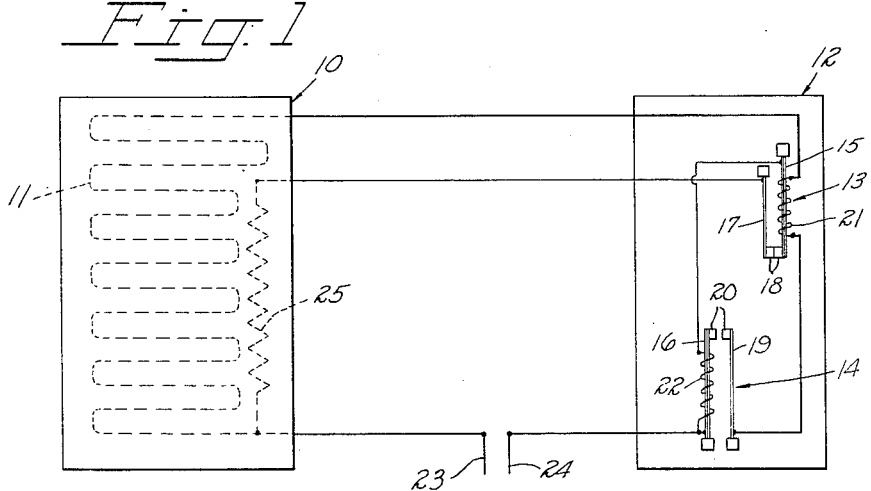
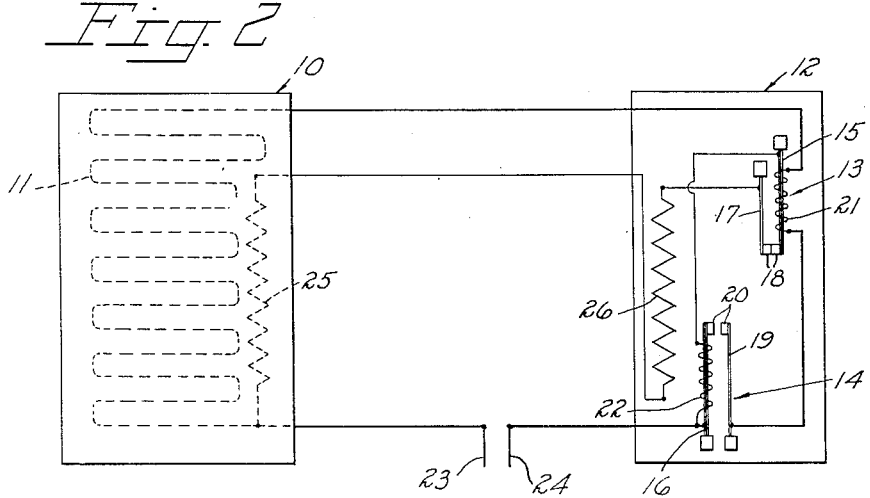
Inventor
ARNOLD E. RUDAHL
By T. Clay Lindsey
Attorney Patented May 30, 1950

2,510,038

UNITED STATES PATENT OFFICE 2,510,038

ELECTRIC BLANKET CONTROL

Arnold E. Rudahl, Middlefield, Conn., assignor to Landers, Frary & Clark, New Britain, Conn., a corporation of Connecticut Application January 17, 1947, Serial No. 722,574

10 Claims. (Cl. 219—46)

The present invention relates to electric blankets and more particularly to a temperature control system therefor which is characterized by its sensitivity to temperature conditions within the blanket itself and also, if desired, to ambient temperatures; which control system is of simplified construction involving a minimum of parts and the elimination of expensive equipment, and is efficient, reliable and safe in operation.

It is an object of the present invention to provide a control circuit for electric blankets which will regulate the amount of heat generated within the blanket to closely approximate the heat loss therethrough, such circuit being responsive to changes in temperature within the blanket itself and, if desired, also to changes in ambient temperatures.

A further object of the invention is to provide a control system of the type referred to which is safe in operation and which is effective in connection with its heat regulating functions for eliminating the hazards of fire.

Another object of the invention is to accomplish the foregoing named objectives by means of a control system which is of simplified construction requiring a minimum of parts and which is not dependent for its operation upon expensive equipment or equipment of the type which can readily become out of adjustment and thus require frequent replacement or repair.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Referring to the drawings—

Figure 1 is a diagrammatic view of one embodiment of a temperature control system constructed in accordance with the invention; and Fig. 2 is a diagrammatic view of a second embodiment of the invention.

Referring particularly to the embodiment shown in Fig. 1 of the drawings, the reference numeral 10 denotes an electric blanket which may be formed of conventional blanketing material and which contains therein an electric heating element 11, which element may be composed of a thin, flexible resistance wire embedded in suitable insulating material and preferably arranged in a plurality of convolutions throughout the blanket so as to provide substantially even heating thereof. This construction is well known in the art and need not be more fully herein.

The reference numeral 12 denotes a control box in which are housed certain of the elements which make up the control circuit to be described hereinafter. In the embodiment shown, these elements comprise two thermal relays 13 and 14 formed with the usual bi-metallic switch arms 15 and 16, respectively. Each of the bi-metallic switch arms 15 and 16 is provided with a heater wire 21 and 22, respectively, suitably wound thereon. The thermal relay 15 is normally closed, that is, the thermal switch arm 15 is in electrical contact with the stationary or adjustable switch arm 17 through the contact points 18. By the term "normally closed" is meant the condition of the thermal relay at ordinary room temperatures. The thermal relay 14, on the contrary, is normally open, that is, at ordinary room temperatures the thermal switch arm 16 is out of electrical contact with the stationary or adjustable switch arm 19, thereby separating the contact points 20. The construction of the thermal relay 13 is such that it will open when the bi-metallic strip 15 becomes heated as, for example, when a current is passed through the heater wire 21. The thermal relay 14, on the other hand, is adapted to close when the bi-metallic strip 16 is heated such as when current is passed through the heater wire 22. Such thermal relays are well known and are readily available commercially and, therefore, need be described only briefly here.

The lines 23 and 24 are intended to denote a conventional source of electrical energy such as the usual household lighting circuit. The line 23 is connected to the heating element 11 and also to a resistance 25 which is contained within the blanket 10. The resistance 25 may comprise a resistance 25 may comprise a resistance wire which is arranged in a plurality of convolutions throughout the blanket, or it may comprise a series of small resistance buttons distributed in series throughout the blanket, or both. It is important only that the resistance 25 shall comprise elements having an electrical conductivity which is sensitive to changes in temperature. In the specific embodiment shown, the resistance element 25 is one which decreases in resistance substantially proportionately to decreases in its temperature.

The opposite end of the heating element 11 is connected to the heater wire 21 which is wound around the bi-metallic switch arm 15, which wire in turn is connected to the stationary switch arm 19 of the thermal relay 16. The opposite end of the resistance 25 is connected to the stationary switch arm 17 of the thermal relay 15. The bi-metallic switch arm 15 of thermal relay 13 is connected to the heater wire 22 which, in turn, is connected to the line 24. The bi-metallic switch arm 16 also is connected to the line 24.

For convenience, the circuit shown in heavy lines running from the line 23 through the heater 11, thence through the heater wire 21 of the thermal relay 15, and from there through the thermal relay 14 to the line 24 will be referred to hereinafter as the "heating circuit." The circuit shown in light lines which runs from the line 23 through the resistance 25 and thermal relay 13 to the heater wire 22 of the thermal relay 14 and from thence to the line 24 will be referred to hereinafter as the "feeler circuit."

The operation of the embodiment shown in Fig. 1 will be understood from the above description taken in connection with the following explanation. When the lines 23 and 24 are connected and the apparatus is in the normal condition shown in Fig. 1, the flow of current can only pass through the "feeler circuit" inasmuch as the thermal relay 14 connected in series with the heating circuit is open. Assuming that the blanket is in a cold condition, the resistance of the "feeler resistance" 25 will be low, thus causing current to pass relatively rapidly through the heater wire 22. This supplies heat to the bi-metallic switch arm 16 which eventually closes the thermal relay 14. Immediately upon this happening, the heating circuit is closed thereby causing heat to be supplied to the blanket through the heater element 11. The passage of current through the heating circuit, by reason of the heater wire 21, causes heat to be supplied to the bi-metallic switch arm 15 thereby eventually causing the thermal relay 13 to open, which thus opens the feeler circuit.

When the feeler circuit is thus opened, current no longer flows through the heater wire 22 with the result that heat is no longer supplied to the bi-metallic switch arm 16 and as this switch arm cools it moves away from the stationary switch arm 19, thereby opening the thermal relay 14. Opening of the thermal relay 14, of course, opens the heating circuit so that heat is no longer supplied to the blanket 10. Thereupon, no heat is furnished to the bi-metallic switch arm 15 by the heater wire 21, which eventually causes the thermal relay 13 to close, thereby again closing the feeler circuit and the apparatus is in condition to repeat the operation as described above.

It will be appreciated that the duration of the heating and non-heating periods will be determined by the temperature conditions of the blanket insofar as this affects the resistance of the feeler resistance 25. The thermal relays 13 and 14 and the feeler resistance 25 can readily be designed and adjusted so as to provide a very sensitive control circuit such that only slight variations in the temperature of the blanket 10 will occur.

The specific embodiment shown in Fig. 2 is essentially the same as that shown in Fig. 1 and description of the various elements need not be repeated inasmuch as the same reference numerals have been utilized. The main difference in this embodiment shown in Fig. 2 lies in the use of an auxiliary resistance 26 in the feeler circuit, which resistance 26 is external to the blanket and, as shown in the drawing, may be conveniently located in the control box 12. The resistance 26 is similar in construction to the resistance 25, particularly insofar as the amount of the resistance thereof decreases substantially in proportion to decreases in its temperature.

The effect of the additional resistance 26 in series with the resistance 25 is to make the feeler circuit responsive not only to temperatures within the blanket, but also to ambient temperatures. It will be obvious that as the room becomes colder the length of the heating periods will be increased, thereby anticipating changes which normally would take place in the blanket 10.

It thus will be seen that there has been provided, in accordance with the invention, a control circuit for electric blankets which is of relatively simple construction eliminating many expensive parts and constructed of conventional elements which will not readily become out of adjustment. The control circuit is sensitive to temperatures within the blanket 10 which not only insures that the desired heating conditions will be obtained, but thus is additionally effective to overcome the fire hazard normally present in electric blankets.

A further safety feature is that any failure of the control or feeler circuit prevents the electric blanket from functioning and, therefore, the blanket cannot be operated unless the controls are in proper operating condition.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A heat control arrangement for an electrically heated blanket comprising, in combination, a blanket, an electrical heating element in said blanket, a resistance element in said blanket whose resistance increases in relationship to increases in its temperature, a first circuit for connecting the heating element to a source of electrical energy, a second circuit for connecting the resistance element to the source of electrical energy, a normally open thermal relay in said first circuit having a heater wire connected in the second circuit, and a normally closed thermal relay in the second circuit having a heater wire connected in the first circuit.

2. A heat control arrangement for an electrically heated blanket comprising, in combination, a blanket, an electrical heating element in said blanket, a resistor in said blanket where it is subject to temperature conditions within the blanket, a resistor exterior to the blanket where it is subject to ambient temperatures, each of said resistors having a resistance value which increases in relationship to increases in its temperature; a first circuit for connecting the heating element to a source of electrical energy, a second circuit for connecting the resistors in series to a source of electrical energy, a normally open thermal relay in the first circuit having a heater wire connected in the second circuit, and a normally closed thermal relay in the second circuit having a heater wire connected in the first circuit.

3. A heat control arrangement for an electrically heated blanket comprising, in combination, a blanket, an electrical heating element in said blanket, a resistor in said blanket whose resistance increases in relationship to increases in its temperature, a first circuit for connecting the heating element to a source of electrical energy, a second circuit for connecting the resistor to a source of electrical energy, normally open switch means in the first circuit adapted to be closed by the flow of current in the second circuit after a time interval dependent on the magnitude of said current, and normally closed switch means in the second circuit adapted to be opened by the flow of current in the first circuit.

4. A heat control arrangement for an electrically heated blanket comprising, in combination, a blanket, an electrical heating element in said blanket, a resistance element in said blanket whose resistance increases in relationship to increases in its temperature, a circuit for connecting the heating element to a source of electrical energy, a normally open relay actuated by the second circuit for closing the first circuit after an interval depending upon the amount of current passing through the second circuit, and a normally closed relay actuated after a predetermined interval of operation by the first circuit for opening the second circuit.

5. A heat control arrangement for an electrically heated blanket comprising, in combination, a blanket, an electrical heating element in said blanket, a resistance element in said blanket whose resistance increases in relationship to increases in its temperature, means including circuits for connecting said elements in parallel to a source of electrical energy, normally open means actuated by the flow of current through the circuit connecting the resistance element at time intervals responsive to the amount of flow of current through said resistance for periodically closing the circuit to the heating element, and normally closed means actuated by the flow of current through the circuit connecting the heating element at time intervals responsive to the amount of flow of current through the heating element for periodically opening the circuit to the resistance element.

6. A heat control arrangement for an electrically heated blanket comprising, in combination, a blanket, an electrical heating element in said blanket, a resistor in said blanket where it is subject to temperature conditions within the blanket, a resistor exterior to the blanket where it is subject to ambient temperatures, each of said resistors having a resistance value which increases with increase in its temperature, a first circuit for connecting the heating element to a source of electrical energy, a second circuit for connecting the resistors to a source of electrical energy, normally open switch means in the first circuit responsive to the amount of flow of current in the second circuit for periodically closing the first circuit, and normally closed switch means in the second circuit responsive to the amount of flow of current through the first circuit for periodically opening the second circuit.

7. A heat control arrangement for an electrically heated blanket comprising, in combination, a blanket, an electrical heating element in said blanket, a resistance element in said blanket whose resistance increases in relationship to increases in its temperature, a second resistance element exterior to the blanket and subject to ambient temperatures whose resistance increases in relationship to increases in its temperature, a circuit for connecting the heating element to a source of electrical energy, a second circuit for connecting the said resistance elements to the source of electrical energy, a normally open relay operated after an interval determined by the flow of current through the second circuit for closing the first circuit, and a normally closed relay operated after a predetermined interval by the flow of current through the first circuit for opening the second circuit.

8. A heat control arrangement for an electrically heated blanket comprising, in combination, a blanket, an electrical heating element in said blanket, a resistance element in said blanket whose resistance increases in relationship to increases in its temperature, a first circuit for connecting the heating element to a source of electrical energy, a second circuit for connecting the resistance element to a source of electrical energy, thermally responsive means in said first circuit operable when heated for closing said circuit, thermally responsive means in said second circuit operable when heated for opening said circuit, means for heating the first named thermally responsive means in proportion to the amount of current passed through the second circuit, and means for heating the second named thermally responsive means in proportion to the amount of current passed through the first circuit.

9. A heat control arrangement for an electric blanket comprising, in combination, a blanket, an electrical heating element in said blanket, a resistance element in said blanket whose resistance increases substantially directly with increases in its temperature, a normally open thermal relay comprising a bimetallic switch arm and a heater wire therefor arranged to close the relay when current is passed through the heater wire, a normally closed thermal relay comprising a bimetallic switch arm and a heater wire therefor arranged to open the relay when current is passed through the heater wire, means for connecting the heating element, a switch arm of the second relay and the heater wire of the first relay in series to a source of electrical energy, and means for connecting the resistance element, a switch arm of the first relay and the heater wire of the second relay in series to the source of electrical energy.

10. A heat control arrangement for an electrically heated blanket comprising, in combination, a blanket, an electrical heating element in said blanket, a resistance element in said blanket whose resistance increases in relationship to increases in its temperature, a second resistance element external to said blanket and subject to ambient temperatures whose resistance increases in relationship to increases in its temperature, a normally closed thermally operated relay having a bimetallic switch arm and an electrical heater wire therefor, a normally open thermally operated relay having a bimetallic switch arm and an electrical heater wire therefor, means for connecting the heating element, the heater wire of the first named relay, and the switch arm of the second named relay in series to a source of electrical energy, and means for connecting the resistance elements, the heater wire of the second named relay and the switch arm of the first named relay in series to the source of electrical energy.

ARNOLD E. RUDAHL.

REFERENCES CITED

The following references are of record in the file of this patent:

UNITED STATES PATENTS

| Number | Name | Date |
|---|---|---|
| 915,974 | Leonard | Mar. 23, 1909 |
| 1,694,264 | Hull | Dec. 4, 1928 |
| 1,979,082 | Schwedenberg et al. | Oct. 30, 1934 |
| 1,979,467 | Hellmuth | Nov. 6, 1934 |
| 2,163,297 | Waage | June 20, 1939 |
| 2,429,453 | Crowley | Oct. 21, 1947 |

FOREIGN PATENTS

| Number | Country | Date |
|---|---|---|
| 338,880 | Great Britain | Nov. 18, 1930 |